(12) United States Patent
West et al.

(10) Patent No.: US 9,349,093 B2
(45) Date of Patent: May 24, 2016

(54) GENERATING A PREDICTION FUNCTION USING A GENETIC ALGORITHM AND A REDUCED NUMBER OF FACTORS

(75) Inventors: Rogene Eichler West, Seattle, WA (US); Stephen Severance, San Francisco, CA (US)

(73) Assignee: PayPal, Inc., San Jose, CA (US)

( * ) Notice: Subject to any disclaimer, the term of this patent is extended or adjusted under 35 U.S.C. 154(b) by 528 days.

(21) Appl. No.: 12/870,334

(22) Filed: Aug. 27, 2010

(65) Prior Publication Data

US 2012/0054134 A1 Mar. 1, 2012

(51) Int. Cl.
*G06N 3/12* (2006.01)

(52) U.S. Cl.
CPC ..................... *G06N 3/126* (2013.01)

(58) Field of Classification Search
None
See application file for complete search history.

(56) References Cited

U.S. PATENT DOCUMENTS

| | | | |
|---|---|---|---|
| 7,233,933 B2 | 6/2007 | Horvitz et al. | |
| 7,356,518 B2 | 4/2008 | Bonabeau et al. | |
| 7,475,048 B2 * | 1/2009 | Weston et al. | 706/20 |
| 7,480,640 B1 | 1/2009 | Elad et al. | |

OTHER PUBLICATIONS

Thomas E. McKee, Terje Lensberg, Genetic programming and rough sets: A hybrid approach to bankruptcy classification, European Journal of Operational Research, vol. 138, Issue 2, Apr. 16, 2002, pp. 436-451.*

Roman W. Swiniarski, Andrzej Skowron, Rough set methods in feature selection and recognition, Pattern Recognition Letters, vol. 24, Issue 6, Mar. 2003, pp. 833-849.*

Terje Lensberg, Aasmund Eilifsen, Thomas E. McKee, Bankruptcy theory development and classification via genetic programming, European Journal of Operational Research, vol. 169, Issue 2, Mar. 1, 2006, pp. 677-697.*

Smith, Lindsay I. "A tutorial on principal components analysis." Cornell University, USA 51 (2002): 52.*

Tan, Feng, et al. "A genetic algorithm-based method for feature subset selection." Soft Computing 12.2 (2008): 111-120.*

Huang, Jinjie, Yunze Cai, and Xiaoming Xu. "A hybrid genetic algorithm for feature selection wrapper based on mutual information." Pattern Recognition Letters 28.13 (2007): 1825-1844.*

Saeys, Yvan, Iñaki Inza, and Pedro Larrañaga. "A review of feature selection techniques in bioinformatics." bioinformatics 23.19 (2007): 2507-2517.*

Guyon, Isabelle, and André Elisseeff. "An introduction to variable and feature selection." The Journal of Machine Learning Research 3 (2003): 1157-1182.*

(Continued)

*Primary Examiner* — Kakali Chaki
*Assistant Examiner* — Daniel Pellett
(74) *Attorney, Agent, or Firm* — Schwegman, Lundberg & Woessner, P.A.

(57) ABSTRACT

Methods and systems to reduce the number of factors or variables that need to be considered in generating a function such as a prediction function. The methods and systems may involve receiving a first set of factors and a data set associated with the first set of factors, calculating an importance value of each factor in the first set of factors, and selecting, based on the importance values, a second set of factors. In some embodiments, the methods and systems also include generating the prediction function based on the data set and the second set of factors.

20 Claims, 5 Drawing Sheets

(56) References Cited

OTHER PUBLICATIONS

Hemmateenejad, Bahram, et al. "Genetic algorithm applied to the selection of factors in principal component—artificial neural networks: application to QSAR study of calcium channel antagonist activity of 1, 4-dihydropyridines (nifedipine analogous)." Journal of chemical information and computer sciences 43.4 (2003): 1328-1334.*

Ying, Liu, Gu Yanfeng, and Zhang Ye. "Hyperspectral feature extraction using selective PCA based on genetic algorithm with subgroups." Innovative Computing, Information and Control, 2006. ICICIC'06. First International Conference on. vol. 3. IEEE, 2006.*

Xian, Bi, et al. "The combination of principal component analysis, genetic algorithm and tabu search in 3d molecular similarity." Journal of Molecular Structure: THEOCHEM 674.1 (2004): 87-97.*

Liu, Huan, and Lei Yu. "Toward integrating feature selection algorithms for classification and clustering." Knowledge and Data Engineering, IEEE Transactions on 17.4 (2005): 491-502.*

Kohavi, Ron, and George H. John. "The wrapper approach." Feature extraction, construction and selection. Springer US, 1998. 33-50.*

Raymer, Michael L., et al. "Dimensionality reduction using genetic algorithms." Evolutionary Computation, IEEE Transactions on 4.2 (2000): 164-171.*

Jolliffe, I. T. Principal Component Analysis. Springer, 2002.*

Almuallim, Hussein, and Thomas G. Dietterich. "Learning with Many Irrelevant Features." AAAI. vol. 91. 1991.*

John, George H., Ron Kohavi, and Karl Pfleger. "Irrelevant features and the subset selection problem." Machine Learning: Proceedings of the Eleventh International Conference. 1994.*

* cited by examiner

US 9,349,093 B2

GENERATING A PREDICTION FUNCTION USING A GENETIC ALGORITHM AND A REDUCED NUMBER OF FACTORS

TECHNICAL FIELD

The present application relates generally to the technical field of use of data processing techniques. More specifically, the present application relates to generating a function given a set of data and, in one specific embodiment, to reducing the number of factors or variables that need to be considered in generating the function.

BACKGROUND

Advancements in computer and processing technologies have enabled persons to perform complex calculations and process large amounts of data in faster times. Modeling tools have been developed to take advantage of the increased processing power to generate outcomes of a scenario or real life situation. Modeling tools typically use various functions to generate outcomes based on a set of data. However, computing power still has its limitations. For example, often, the more variables a modeling function uses, the slower the results are calculated and the more resources are required.

Some functions used may yield better or more accurate results. Other functions may be performed more efficiently, using fewer resources. Determining an optimal function to be used in a modeling function is a difficult task, especially when numerous variables and factors may be considered.

BRIEF DESCRIPTION OF THE DRAWINGS

Some embodiments are illustrated by way of example and not limitation in the figures of the accompanying drawings, in which.

DETAILED DESCRIPTION

Figure 1:
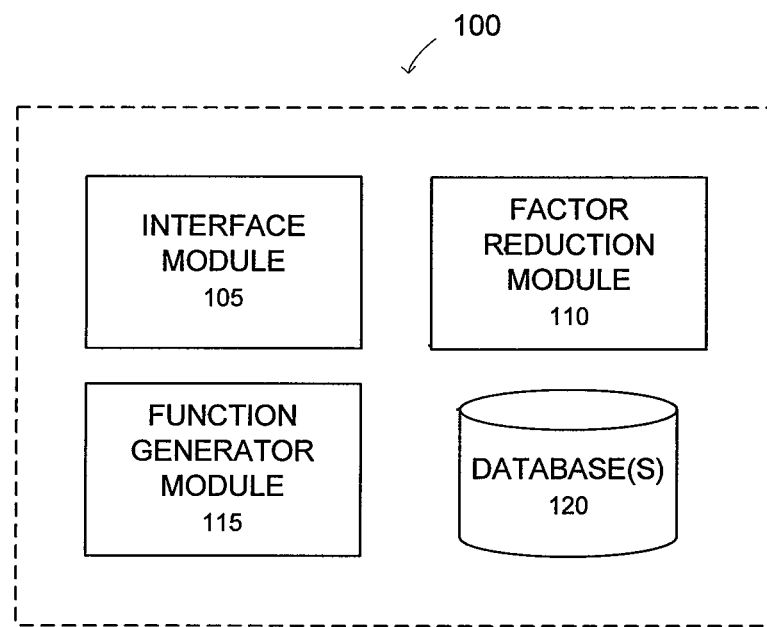
FIG. 1 is a block diagram illustrating a machine within which an example factor reduction module and an example function generator module may be implemented, in accordance with one example embodiment.

Example methods and systems to generate a function given a set of data are described. In the following description, for purposes of explanation, numerous specific details are set forth in order to provide a thorough understanding of example embodiments. It will be evident, however, to one skilled in the art that the present invention may be practiced without these specific details.

A system is disclosed to reduce the number of factors or variables that need to be considered in generating a function such as a prediction function that predicts an outcome based on several variables. In some embodiments, the system may further be configured to generate the function. A genetic algorithm is a technique used to compute an effective function according to various embodiments. It involves generating a number of possible functions and evaluating the fitness or performance of each of the possible functions. Certain possible functions are selected based on their performance and may be modified to form a new set of possible functions. This process typically repeats for a number of cycles, for a certain amount of time, or until satisfactory results are obtained.

Genetic algorithms may be used to solve a multitude of problems. However, genetic algorithms generally require a large amount of computing resources. Often, the complexity of the problem or the number of factors that need to be considered in solving a problem prohibit the use of genetic algorithms. For example, any number of factors may be considered in predicting whether a price of a stock will go up. Some example factors that are meant to illustrate the breadth and variety of factors that may be considered include price of a stock, price-to-earnings ratio, change in price over the last 10 days, change in price over the past month, dividend yield, current month, volume traded, industry area, price momentum, number of press-releases over the last 10 days, number of positive or negative mentions in the media over the past 30 days, quality of the media outlet, change in the number employed over the last 60 days, number of days until a product launch, etc. In one embodiment, a genetic algorithm may be used to generate a function that predicts the price of stock in the future. Often, the more factors that are considered, the more accurate a prediction function will be. However, when too many factors are considered, a genetic algorithm may not be able to efficiently calculate an accurate prediction function.

Principal component analysis (PCA) is a technique that may be used in various embodiments to transform a number of factors or variables into a smaller set of factors or variables associated with a result. In one embodiment, the original set of factors may include factors that are correlated with one another and the principal component analysis may be used to transform these factors into a smaller set of uncorrelated factors (e.g., principal components). In another embodiment, the number of factors is reduced (e.g., by using PCA) such that only a manageable number of the important factors are selected. After the number of factors is reduced, the selected factors may be used in a genetic algorithm to generate a solution prediction function.

For example, a system may be configured to generate a solution prediction function that predicts the price of a stock in the future. To do so, the system may track a large number of factors or variables for a large number of companies. The following list illustrates some of the factors the system may track: average price of a stock over various periods (e.g., 50 day average, 100 day average, 200 day average, 14 day average, etc.), current price of a stock, volume of shares being traded a day for various time periods, company debt, market capitalization, number of shares, price-to-earnings (P/E) ratio, volatility, price range over a various periods, various data on the stock market indices, various economic indicators (e.g., unemployment rates, housing starts, Consumer Price Index, bankruptcies, Gross Domestic Product (GDP), retail sales, etc.), number of positive and/or negative company mentions in various media over a certain period of time, number of press releases made by a company over a certain period of time, industries the company participates in, various data for the company's competitors, or any other data associated with a company or a company's stock that may be monitored. In many cases, the number of factors or factors being monitored is large. In some embodiments, tens of thousands of factors may be monitored, sometimes even more.

There may be some redundancy in the factors being monitored. In some cases, the redundancy may be caused by one or more factors being correlated with one another, possibly because they measure the same or similar aspects. For example, the price per share and the P/E ratio may be correlated. PCA may be used to reduce the amount of redundancy in the factors being monitored into a smaller number of factors. The smaller number of factors (e.g., principal components) may include artificial factors that are a combination of one or more correlated factors.

In one embodiment, the system may also generate a prioritized list of factors that indicates the relative importance of each of the factors. A subset of these factors may be selected to be used in a genetic algorithm module to generate a solution prediction function that predicts the price of a stock in the future.

FIG. 1 is a block diagram illustrating a machine 100 within which an example factor reduction module 110 and an example function generator module 115 may be implemented, in accordance with one example embodiment. As described more completely below, each module may be comprised of software instructions, computer hardware components (e.g., a processor), or a combination of both. To avoid obscuring this embodiment in unnecessary detail, other components of machine 100 are not illustrated. The machine 100 illustrated in FIG. 1 includes an interface module 105, a factor reduction module 110, a function generator module 115, and one or more databases 120.

The interface module 105 may be configured to send and receive data from one or more data sources. For example, the interface module 105 may receive data sets associated with various factors or variables from one or more databases 120 and transmit functions to other components of the machine 100 or outside of a machine via a network (e.g., the Internet). The factor reduction module 110 is configured to use the data set associated with the various factors or variables and select a subset of factors to consider in generating a performance prediction function. For example, the factor reduction module 110 may rank or assign values to the various factors based on how strongly they affect the results in the dataset. Based on the ranking or assigned values, the factor reduction module 110 may select the variables that most strongly affect the results. The factor reduction module 110 may also reduce the number of factors considered by grouping together factors that are correlated. In one embodiment, the factor reduction module 110 may use principal component analysis (PCA) to reduce the number of factors that are to be considered by the function generator module 115.

The function generator module 115 may be configured to take a data set associated with results and generate a function that operates on the data set and outputs results that match or approximate the results associated with the data set. This concept may be better illustrated using one embodiment directed towards generating a function that, given a set of data, predicts whether the price of a stock will go up. Although the following embodiment relates to stock prices, other items that fluctuate in value may also be considered.

For example, the data set may be a sample data set of data associated with one or more stocks or a companies represented by the stocks. For example, for each stock represented in the data set, information that may be recorded in the data set may include: average price of a stock over various periods, current price of a stock, volume of shares being traded a day for various time periods, company debt, market capitalization, the number of shares, price-to-earnings (P/E) ratio, volatility, price range over a various periods, various data on the stock market indices, various economic indicators, number of positive and/or negative company mentions in various media over a certain period of time, number of press releases made by a company over a certain period of time, the industries the company participates in, various data for the company's competitors, or any other data associated with a company or a company's stock that may be monitored. In many cases, the number of factors or factors being monitored is large. In some embodiments, tens of thousands of factors may be monitored, sometimes even more. The function generator module 115 may use this data set to generate a function that matches or approximates the results (e.g., the current price of the stock) associated with the data set. This process may be better understood with respect to the data flow diagram of one embodiment illustrated in FIG. 2.

Figure 2:
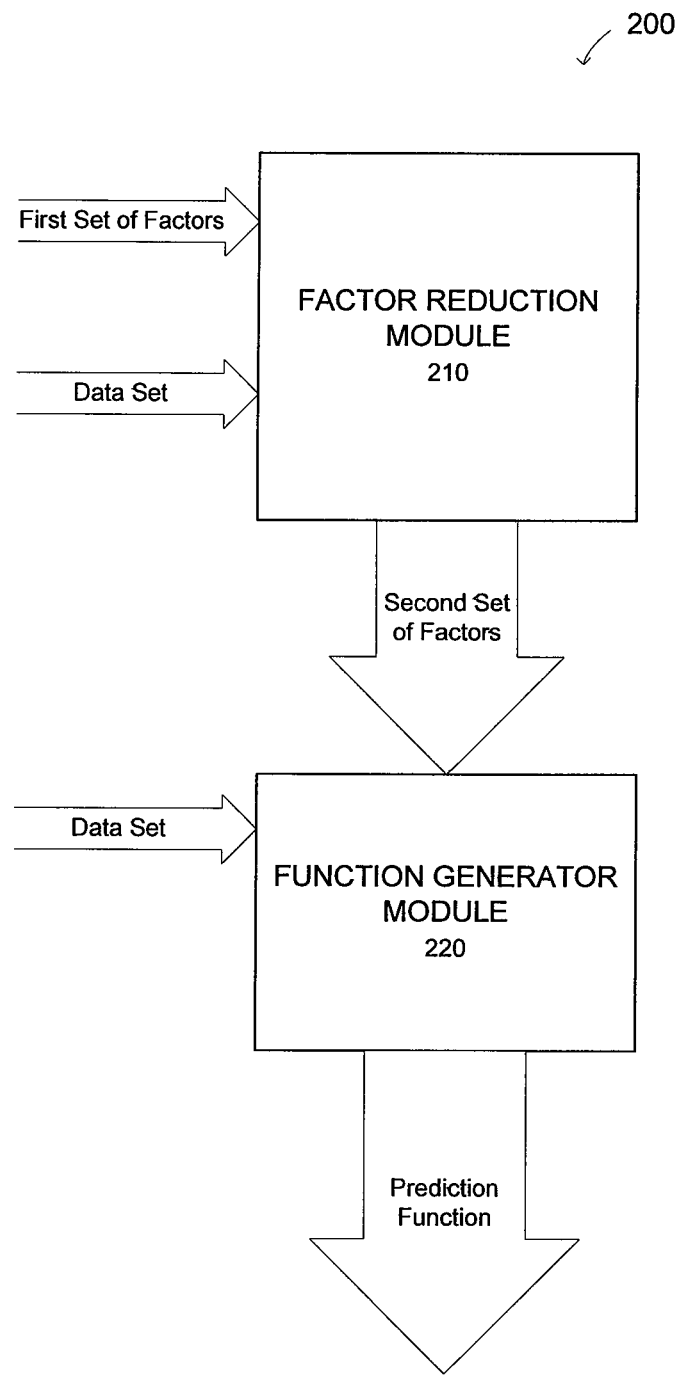
FIG. 2 is a data flow diagram illustrating the interaction between the factor reduction module and the function generator module, in accordance with one example embodiment.

FIG. 2 is a data flow diagram 200 illustrating the interaction between the factor reduction module 210 and the function generator module 220, in accordance with one example embodiment. As mentioned above, the factor reduction module 210 uses a data set and a first set of factors associated with the data set to generate a second set of factors associated with the data set. The first set of factors may be derived from the data set or received from another source.

After the second set of factors are generated, the function generator module 220 receives the second set of factors and uses it and a data set to generate a prediction function. The data set may, in some embodiments, be the same data set operated on by the factor reduction module 210. Further details of this process, according to one embodiment, are illustrated with respect to FIGS. 3 and 4.

Figure 3:
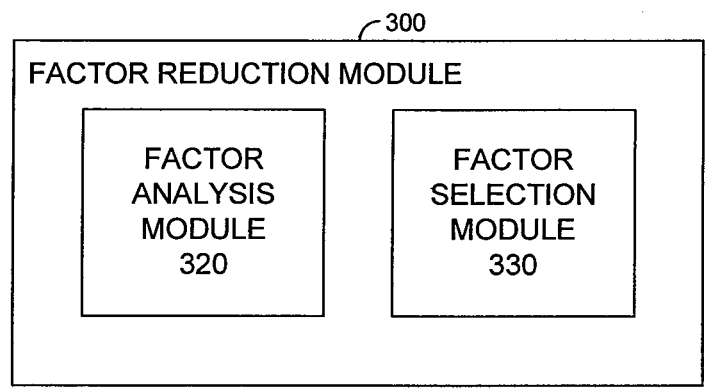
FIG. 3 is a block diagram illustrating a factor reduction module, in accordance with one example embodiment.

FIG. 3 is a block diagram illustrating a factor reduction module 300, in accordance with one example embodiment. The factor reduction module 300 may comprise a factor analysis module 320 and a factor selection module 330. The factor analysis module 320 may be configured to identify one or more results in the data set, determine which of factors of the first set of factors affect the results, and determine how much each factor affects the results. For example, if variation of one factor results in a relatively large variation in the result, that factor affects the result a good deal. If a variation of another factor results in little or no variation in the result, that factor affects the result only a little or not at all. The factor analysis module 320 may assign each factor an importance value based on the degree that the factor affects the result. The factor selection module 330 may be configured to select the second set of factors based on their importance values. For example, the factor selection module 330 may select all factors that meet or exceed a certain importance value threshold or select a predetermined number of factors that are associated with the highest importance values.

In other embodiments, factors that may be correlated may be grouped together to form another factor that is included in the second set of factors. For example, if variation of one factor typically corresponds to a variation in another factor or if two or more factors are similarly correlated with a result, these factors may be correlated. The factor analysis module 320 may determine that two or more factors are correlated, identify the correlated factors, determine a degree of correlation, and, in some embodiments, formulate a correlation formula that expresses or approximates how the factors are related to one another. The factor selection module 330 may be used to select a subset of the correlated factors to be included in the second set of factors or generate one or more new factors based on the correlated factors and include the new factor in the second set of factors.

Figure 4:
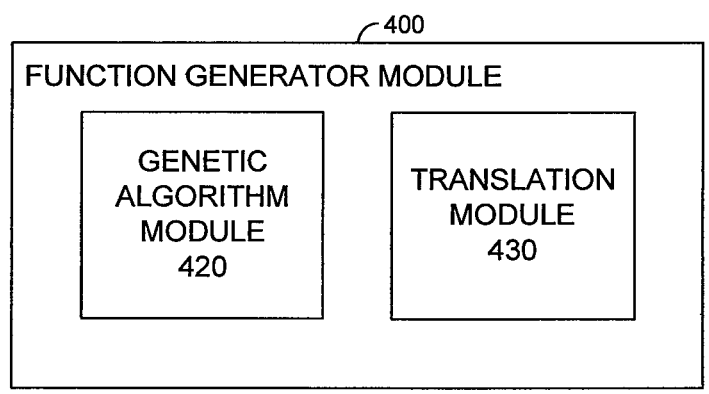
FIG. 4 is a block diagram illustrating a function generator module, in accordance with one example embodiment.

FIG. 4 is a block diagram illustrating a function generator module 400, in accordance with one example embodiment. The function generator module 400 may comprise a genetic algorithm module 420 and a translation module 430. The genetic algorithm module 420 may use a genetic algorithm or some other evolutionary algorithm to generate a function. In order to better explain the operations of the genetic algorithm module 420, operations will be discussed in the context of an example function (e.g., a prediction function that predicts whether the price of a stock will go up) however these principles may be applied to other types of functions as well. In one embodiment, the genetic algorithm module 420 may generate a number of different potential prediction functions based on one or more of the factors associated with the data set. The different potential prediction functions may act to take the data associated with various factors associated with a stock price and generate a prediction on whether the stock price will go up. In some embodiments, the potential prediction functions may also generate a prediction about how much the stock price will go up. The potential prediction functions may be generated randomly or based on a predetermined formula or pattern.

Each of the potential prediction functions may be applied to each stock in the data set to generate a prediction for each stock. The predictions that result from the application of each potential prediction function may be compared to the actual results (e.g., whether the price of the stocks in the data set actually went up) and the performance of each potential prediction function is determined based on how closely the predictions made by the potential prediction function compare the actual results.

One or more of the potential prediction functions may be selected based on their performance. In some embodiments, additional potential prediction functions may be created based on a selected potential prediction function. For example, a new potential prediction function may be generated based on a modified version of another potential prediction function (e.g., the new potential prediction function may have an incorporate an additional factor, remove a factor, or some other modification of the prediction function). Other potential prediction functions may be generated by combining selected potential prediction functions. The modification or combination of potential prediction functions may be done at random or according to a predetermined formula or pattern.

These newly generated potential prediction functions may be used in the next iteration or cycle of the process (e.g., applied to the data set to generate predictions, selected based on performance, used to generate new potential prediction functions, etc.). In one embodiment, the potential prediction functions selected from the previous iteration are used along with the newly generated potential prediction functions in the next iteration to make it more likely that the next "generation" of potential prediction functions will perform the same as, if not better than, the previous generation.

The process of generating potential prediction functions, applying them to the data set, selecting potential prediction functions based on their performance, and modifying them may repeat for several cycles (e.g., iterations or generations). The process may stop when a certain number of cycles have been performed, when a certain amount of time has elapsed, when one or more potential prediction functions reach a certain level of performance, or when some other event has occurred. At the end of the process, the genetic algorithm module 420 may select one or more of the best performing potential prediction functions as a solution prediction function.

The solution prediction function that results from the operations of the genetic algorithm module 420 may not be easily read and understood by humans. Therefore, in one embodiment, a translation module 430 may be configured to translate or convert the solution prediction function into a natural language sentence.

Figure 5:
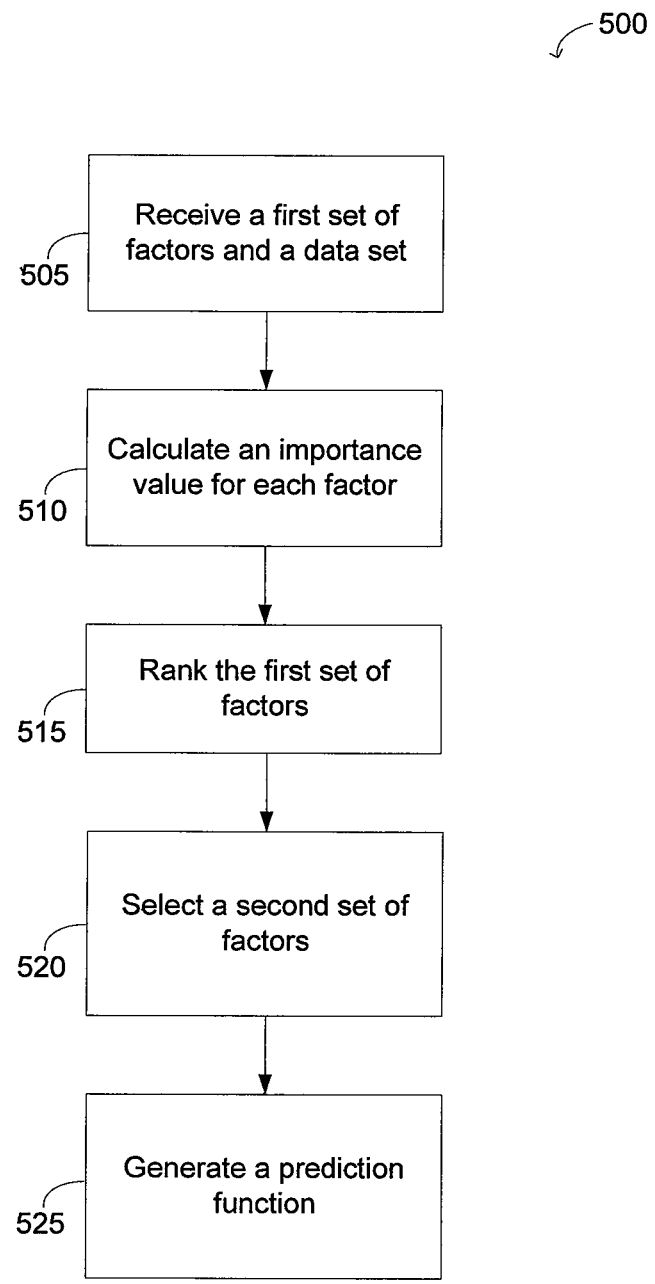
FIG. 5 is a flow diagram illustrating a method to generate a prediction function, according to various embodiments.

FIG. 5 is a flow diagram illustrating a method 500 to generate a prediction function, according to various embodiments. One or more of the operations of method 500 may be performed using a processor. The method 500 begins at operation 505, where the interface module receives a first set of factors and a data set associated with the first set of factors. At operation 510, the factor analysis module 320 of FIG. 3 is to calculate an importance value for each factor in the first set of factors. The importance value for each factor may be calculated based on the degree a variation of the factor's value affects a result. In some embodiments, the importance values are calculated in a principal component analysis. For example, if a variation of a factor's value strongly affects a result, that factor will have a high importance value. If the variation of the factor's value does not affect a result at all, that factor may have a zero importance value. In one embodiment, new factors created based on a group of correlated factors may also be assigned importance values.

At operation 515, the factor analysis module 320 ranks the first set of factors based on the importance values of each factor. The factor selection module 330 of FIG. 3 then selects a second set of factors at operation 520 based on their importance values and their relative ranks. The factor selection module 330 may select all factors that are associated with importance values that meet or exceed a certain cutoff value or select a predetermined number of factors that have the highest importance values. The selected second set of factors may be a subset of the first set of factors or they may also include new factors that are generated based on a group of correlated factors in the first set of factors. In many cases, the second set of factors will have fewer factors than the first set of factors so that the genetic algorithm module 420 of FIG. 4 will not need to consider as many factors. At operation 525, the genetic algorithm module 420 generates a prediction function based on the second set of factors.

Figure 6:
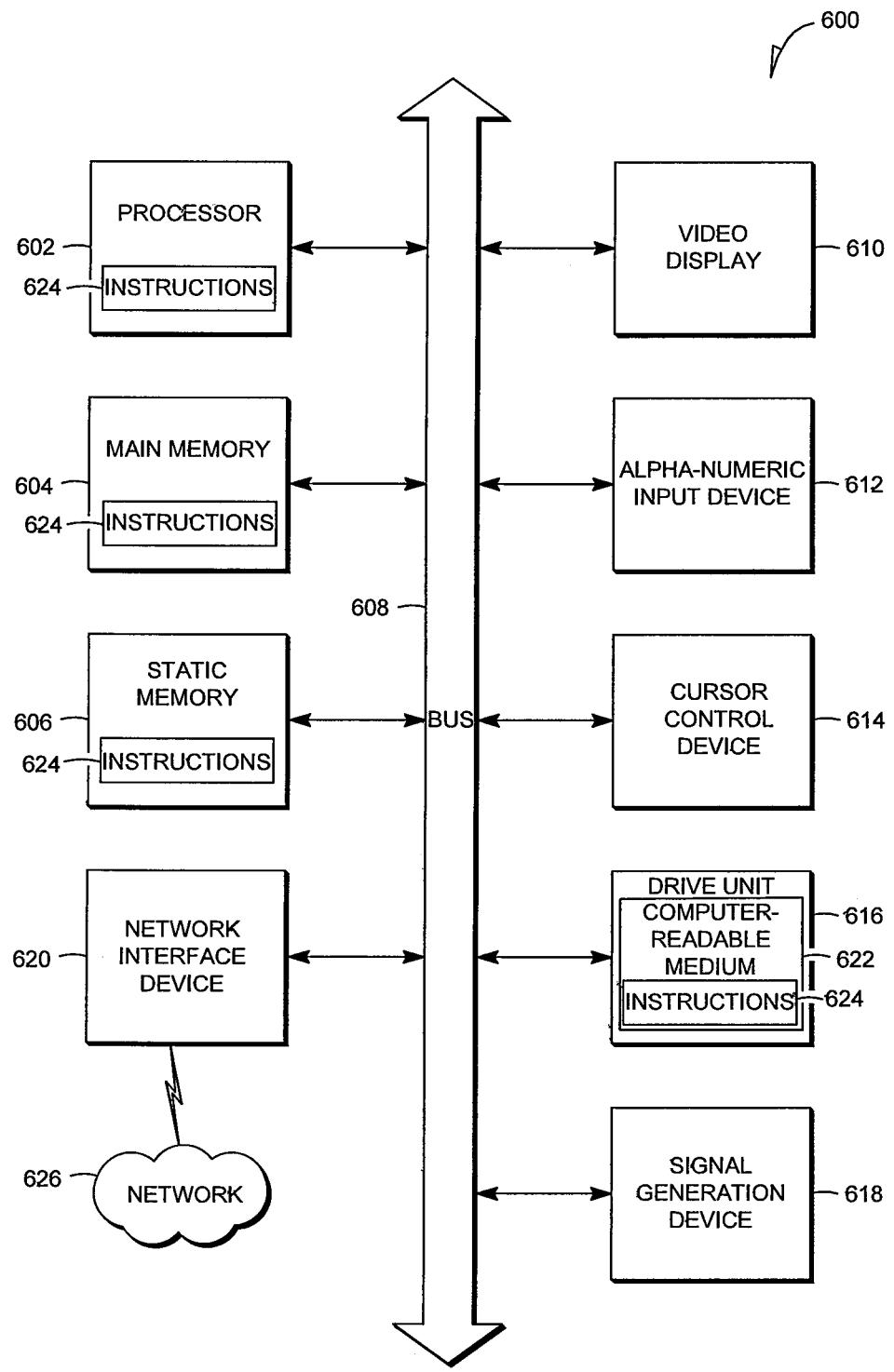
FIG. 6 is a diagrammatic representation of a machine in the example form of a computer system, according to various embodiments.

FIG. 6 is a diagrammatic representation of a machine in the example form of a computer system 600, according to various embodiments within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media. The software 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding or carrying a set of instructions for execution by the machine and that cause the machine to perform any one or more of the methodologies of the present disclosure. The term "machine-readable medium" shall accordingly be taken to include, but not be limited to, storage mediums such as solid-state memories, optical media, and magnetic media.

Thus, a method and system to reduce the number of factors or variables that need to be considered in generating a function and to generate the function are described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving a first set of factors and a data set associated with the first set of factors a factor from the first set of factors measuring an aspect of the data set;
   calculating, based on the data set, an importance value of each factor in the first set of factors, the calculating of an importance value of each factor in the first set of factors comprising:
   generating a function that approximates results associated with the data set,
   determining that variation of a first factor from the first set of factors results in greater variation in the results associated with the data set as compared to variation of a second factor from the first set of factors, and
   assigning a higher importance value to the first factor from as compared to an importance value for the second factor from the first set of factors;
   ranking the first set of factors based on the importance value of each factor in the first set of factors;
   selecting, based on the ranking, factors to be included in a reduced set of factors, the reduced set of factors having fewer factors than the first set of factors;
   and
   generating, using a genetic algorithm, a prediction function based on the data set and the reduced set of factors, the reduced set of factors derived from the first set of factors.

2. The method of claim 1, calculating, based on the data set, an importance value of each factor in the first set of factors wherein the calculating of the importance value of each value in the first set of factors is done using principal component analysis (PCA).

3. The method of claim 1, wherein the reduced set of factors is a subset of the first set of factors.

4. The method of claim 1, wherein the calculating of the importance value of each factor of the first set of factors is based on how closely the factor is correlated with a result.

5. The method of claim 4, wherein the calculating of the importance value of each factor of the first set of factors is further based on whether the other factors of the first set of factors are similarly correlated with the result.

6. The method of claim 1, wherein the selecting of the reduced set of factors is based on a cutoff value, the method further comprising determining the cutoff value.

7. The method of claim 1, further comprising translating the performance prediction function into a natural language sentence.

8. The method of claim 1, further comprising:
   determining that two or more factors from the first set of factors are correlated based on comparing respective aspects being measured by the two or more factors; and
   generating a new factor that is a combination of the two or more correlated factors, the new factor to be included in the reduced set of factors, the reduced set of factors having fewer factors than the first set of factors.

9. A system comprising:
   an interface to receive, implemented using at least one processor, a first set of factors and a data set associated with the first set of factors, a factor from the first set of factors measuring an aspect of the data set;
   a function generator module, implemented using at least one processor, to generate a function that approximates results associated with the data set;
   a factor analysis module, implemented using at least one processor, to:
   calculate, based on the data set, an importance value of each factor in the first set of factors, the calculating of an importance value of each factor in the first set of factors comprising determining that variation of a first factor from the first set of factors results in greater variation in the results associated with the data set as compared to variation of a second factor from the first set of factors and assign a higher importance value to the first factor from as compared to an importance value for the second factor from the first set of factors, rank the first set of factors based on the importance value of each factor in the first set of factors, select, based on the ranking, factors to be included in a reduced set of factors, the reduced set of factors having fewer factors than the first set of factors, the function generator module to generate, using a genetic algorithm, a prediction function based on the data set and the reduced set of factors, the reduced set of factors derived from the first set of factors.

10. The system of claim 9, wherein the factor analysis module is to calculate the importance value of each value in the first set of factors is done using principal component analysis (PCA).

11. The system of claim 9, wherein the factor selection module is to combine at least two factors of the first set of factors to generate a new factor.

12. The system of claim 9, wherein the factor analysis module is to calculate the importance value of each factor of the first set of factors is based on how closely the factor is correlated with a result.

13. The system of claim 12, wherein the factor analysis module is to calculate the importance value of each factor of the first set of factors is further based on whether the other factors of the first set of factors are similarly correlated with the result.

14. The system of claim 9, wherein the selecting of the reduced set of factors is based on a cutoff value, the system further comprising determining the cutoff value.

15. The system of claim 9, further comprising:

a translation module to translate, using the at least one processor, the performance prediction function into a natural language sentence.

16. A machine-readable non-transitory storage medium comprising stored instructions, wherein the instructions, when executed, cause a machine to perform operations comprising:

receiving a first set of factors and a data set associated with the first set of factors, a factor from the first set of factors measuring an aspect of the data set;

calculating, based on a data set, an importance value of each factor in a first set of factors, the calculating of an importance value of each factor in the first set of factors comprising:

generating a function that approximates results associated with the data set, determining that variation of a first factor from the first set of factors results in greater variation in the results associated with the data set as compared to variation of a second factor from the first set of factors, and assigning a higher importance value to the first factor from as compared to an importance value for the second factor from the first set of factors;

ranking the first set of factors based on the importance value of each factor in the first set of factors;

selecting, based on the ranking, factors to be included in a reduced set of factors, the second set of factors having fewer factors than the first set of factors;

and generating, using a genetic algorithm, a prediction function based on the data set and the reduced set of factors, the reduced set of factors derived from the first set of factors.

17. The machine-readable medium of claim 16, wherein the importance value of each value in the first set of factors is calculated using principal component analysis (PCA).

18. The machine-readable medium of claim 16, wherein the importance value of each factor of the first set of factors is calculated based on how closely the factor is correlated with a result.

19. The machine-readable medium of claim 18, wherein the importance value of each factor of the first set of factors is further calculated based on whether the other factors of the first set of factors are similarly correlated with the result.

20. The machine-readable medium of claim 16, wherein the selecting of the reduced set of factors is based on a cutoff value, the system further comprising determining the cutoff value.

* * * * *